United States Patent
He et al.

(10) Patent No.: US 8,532,991 B2
(45) Date of Patent: Sep. 10, 2013

(54) SPEECH MODELS GENERATED USING COMPETITIVE TRAINING, ASYMMETRIC TRAINING, AND DATA BOOSTING

(75) Inventors: Xiaodong He, Issaquah, WA (US); Jian Wu, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 360 days.

(21) Appl. No.: 12/720,968

(22) Filed: Mar. 10, 2010

(65) Prior Publication Data

US 2010/0161330 A1    Jun. 24, 2010

Related U.S. Application Data

(62) Division of application No. 11/156,106, filed on Jun. 17, 2005, now Pat. No. 7,693,713.

(51) Int. Cl.
    *G10L 15/06* (2013.01)
    *G10L 15/00* (2013.01)

(52) U.S. Cl.
    USPC .......................................... 704/243; 704/255

(58) Field of Classification Search
    None
    See application file for complete search history.

(56) References Cited

U.S. PATENT DOCUMENTS

| | | | |
|---|---|---|---|
| 4,837,831 A | 6/1989 | Gillick et al. | |
| 6,076,059 A * | 6/2000 | Glickman et al. | 704/260 |
| 6,263,308 B1 * | 7/2001 | Heckerman et al. | 704/231 |
| 6,691,091 B1 * | 2/2004 | Cerisara et al. | 704/255 |
| 7,016,829 B2 * | 3/2006 | Brill et al. | 704/9 |
| 7,181,391 B1 * | 2/2007 | Jia et al. | 704/231 |
| 7,257,532 B2 | 8/2007 | Toyama | |
| 7,383,181 B2 * | 6/2008 | Huang et al. | 704/231 |
| 7,475,010 B2 | 1/2009 | Chao | |
| 2002/0165714 A1 | 11/2002 | Beyerlein | |
| 2005/0075875 A1 | 4/2005 | Shozakai et al. | |
| 2006/0041428 A1 | 2/2006 | Fritsch et al. | |
| 2006/0212294 A1 | 9/2006 | Gorin et al. | |

OTHER PUBLICATIONS

Xiaodong He; Wu Chou; "minimum classification error linear regression for acoustic model adaptation of continuous density HMMS," Multimedia and Expo, 2003. ICME '03. Proceedings. 2003 International Conference on, Jul. 6-9, 2003, 397-400 vol. 1.*

Wu Chou; "Discriminant-function-based minimum recognition error rate pattern-recognition approach to speech recognition," Proceedings of the IEEE, Aug. 2000, vol. 88 Issue:8 1201-1223.*

U.S. Appl. No. 11/156,106 Office Action mailed May 18, 2009.

Padrta, Ales et al., "On the background model construction for speaker verification using GMM," Text, Speech and Dialouge, pp. 425-432 (2005).

Asai, Kiyoshi et al., "Dividing the distributions of HMM and Linear interpolation in speech recognition" Acoustics, Speech and Signal Processing, vol. 1, pp. 29-32 (1992).

U.S. Appl. No. 11/156,106 Notice of Allowance mailed Nov. 20, 2009.

* cited by examiner

*Primary Examiner* — Angela A Armstrong

(74) *Attorney, Agent, or Firm* — Merchant & Gould

(57) ABSTRACT

Speech models are trained using one or more of three different training systems. They include competitive training which reduces a distance between a recognized result and a true result, data boosting which divides and weights training data, and asymmetric training which trains different model components differently.

20 Claims, 10 Drawing Sheets

SPEECH MODELS GENERATED USING COMPETITIVE TRAINING, ASYMMETRIC TRAINING, AND DATA BOOSTING

CROSS-REFERENCE TO RELATED APPLICATION

The present application is a divisional of and claims priority of U.S. patent application Ser. No. 11/156,106, filed Jun. 17, 2005, the content of which is hereby incorporated by reference in its entirety.

BACKGROUND

Current speech recognition systems rely on a variety of different statistical models in performing speech recognition. Among those models are acoustic models and speech activity detection models. An acoustic model describes the acoustic properties of speech signals. A speech detection model is used to distinguish between speech signals and non-speech signals, such as background noise, and to feed only speech signals to the speech recognition engine.

Both of these types of models, and some others in speech systems, are generally statistical models that include many Gaussian mixtures. However, there are some problems associated with training these types of models.

In acoustic modeling, Gaussian probability distributions are built for thousands of different context dependent phones. In some current systems, these Gaussian mixtures are trained using maximum likelihood training. Basically, maximum likelihood training means that, for each sub-phone (sometimes referred to as a senone), given the data corresponding to the senone, Gaussian mixtures are built to represent the data distribution by maximizing the likelihood of producing the data given the Gaussian Mixture Model of that senone. Distributions of different senones are estimated separately. In addition, the interactions between different distributions are not explicitly considered in model training.

This type of maximum likelihood training encounters a problem, which is basically one of competition. In other words, in generating a speech recognition result, senone models compete with one another. For instance, a speech recognizer might generate a plurality of possible word strings for a given speech input. Each of these valid word strings (e.g., those word strings validated by a language model) includes a sequence of phones, and therefore, a sequence of corresponding senones. The different phone sequences in the different possible word strings compete with one another, and the phone sequence with the highest score wins. The winning phone sequence is output by the speech recognition system as the recognition result. The absolute value of the likelihood is unimportant.

Moreover, acoustic models are very complicated models. They usually include tens of thousands of multi-dimensional Gaussian probability distributions, and describe the properties of thousands of different context-dependent phones. In current maximum likelihood training systems, Gaussian distributions of different phones are trained using the same training techniques and the same settings. However, the properties of different phones may be very different, and may require different settings for the training algorithm in order to achieve optimal results.

Some of the problems associated with speech activity detection models are similar to those for acoustic models, and other speech-related models. A basic speech activity detection model in a speech recognition system has a number of functions. One function is to find a meaningful speech segment within an acoustic signal, and feed that speech segment into the recognition engine. Another basic function is to trigger a barge-in scenario when a user begins to speak to an automated system, such as a telephony system or another device based on automated speech recognition.

In performing the first function, the speech activity detection system attempts to reject silence or noise, as much as possible, which is equivalent to reducing the false acceptance rate of silence/noise, and provide only speech to the speech recognizer. This helps to ensure that recognition is more accurate.

In performing the second function, the system attempts to improve system performance so that it responds to the user as soon as possible, and so that the user experience is enhanced to some extent. The system attempts to reduce a false rejection rate—the rate at which valid speech signals are erroneously rejected as being noise or silence.

Energy-based detection systems are currently used in some speech activity detectors, and these types of systems can work quite well in normal conditions. However, one of the challenges in many applications which implement speech activity detectors (such as telephony or other speech recognition-based systems) is to address the presence of environmental noise or channel noise. In terms of energy content, the difference between a speech signal having a very low amplitude, and environmental noise or channel noise, is sometimes not significant enough to make an appropriate decision in the speech activity detector.

Another approach to speech activity detection is referred to as a recognition-based approach. This approach builds up a set of statistical models, each representing different events relative to the speech activity detector, such as speech, silence, the transition phase from silence to speech, and the transition phase from speech to silence, environmental noise, etc. By considering more subtle information than energy itself, these models can be integrated with a uniform statistical pattern recognition process. The output of the recognition process is used as the basis of a decision for a speech activity detector.

No matter which of these approaches are used, the goals of rejecting silence and responding to speech are not easy to meet. Usually, one must make a tradeoff. In other words, a developer must either tune the decision threshold closer to silence so that low amplitude speech signals will be passed to the speech recognition engine, and so that a barge-in scenario will be launched with a low amplitude speech signal, or one must tune the decision threshold closer to speech so that less non-speech waveforms are passed to the speech recognition system.

Speech detectors face other problems too. As mentioned above, the input waveform to a speech detection system can represent pure speech, or the transition phase from silence to speech (sometimes referred to as onset), or a short pause between speech phrases. The waveform can also represent silence, the echo of a prompt, coughing, environmental noise, etc., all of which corresponds to a non-speech segment. However, for a particular speech event (speech, non-speech, onset, etc.), the most often confused non-speech counterpart might be different. For example, the pure speech segment is often confused with an echo of a prompt or with background noise, because they all have a relatively high energy content. However, the transition phase from silence to speech is often confused with silence, because they have overlapping regions (silence).

In current training, all of the model parameters are trained with the same training framework and the same controlling parameters. However, it is clear that the most commonly confused speech events are different, depending on the speech event under analysis. For instance, the difference between speech and noise can be learned because of their different nature. While silence and the transition phase are not as easily learned because their training samples overlap one another.

The discussion above is merely provided for general background information and is not intended to be used as an aid in determining the scope of the claimed subject matter.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter In one embodiment, the present invention identifies a distance between an actual recognition result and a recognition result which is known to be correct. Instead of only training the models to maximize a likelihood of generating the training data, given the correct phone\event transcription, the present invention minimizes the distance between the actual and known, correct recognition results. This has the affect of repositioning the distributions within the models to better align to the actual training data.

In another embodiment, the present invention divides out portions of the model and uses different training settings, or even different training algorithms, to train the different model portions. The model portions are then merged and can optionally be commonly trained using a common training algorithm, to obtain the final model.

In another embodiment, training data is divided into groups based on whether it is erroneously processed by the speech model. Each group is weighted and the speech model is trained based on the weighted data.

DETAILED DESCRIPTION

The present invention deals with training speech models. However, before describing the present invention in greater detail, one illustrative environment in which the present invention can be used will be described.

Figure 1:
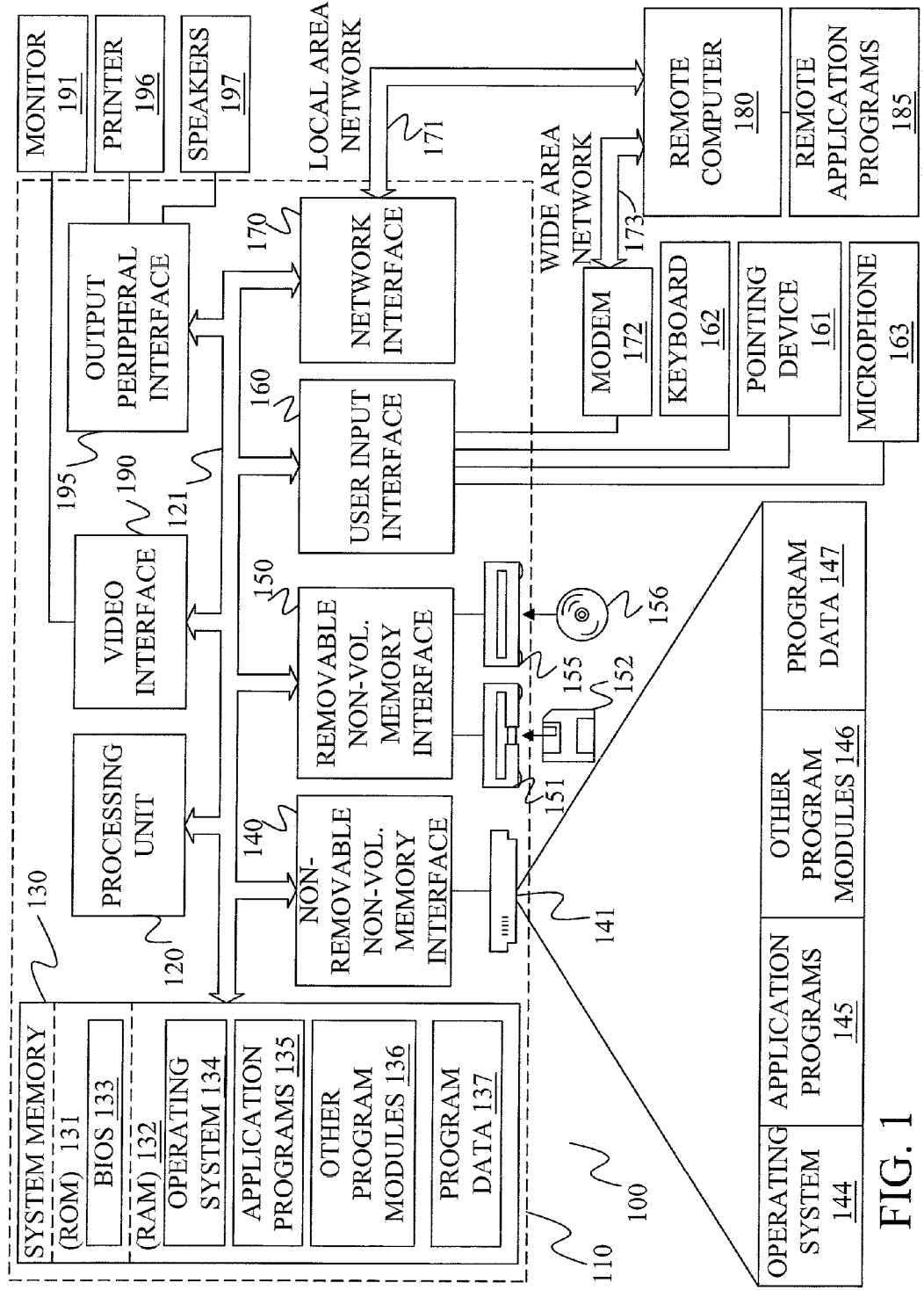
FIG. 1 is a block diagram of one illustrative embodiment in which the present invention can be used.

FIG. 1 illustrates an example of a suitable computing system environment 100 on which the invention may be implemented. The computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

The invention is operational with numerous other general purpose or special purpose computing system environments or configurations. Examples of well-known computing systems, environments, and/or configurations that may be suitable for use with the invention include, but are not limited to, personal computers, server computers, hand-held or laptop devices, multiprocessor systems, microprocessor-based systems, set top boxes, programmable consumer electronics, network PCs, minicomputers, mainframe computers, telephony systems, distributed computing environments that include any of the above systems or devices, and the like.

The invention may be described in the general context of computer-executable instructions, such as program modules, being executed by a computer. Generally, program modules include routines, programs, objects, components, data structures, etc. that perform particular tasks or implement particular abstract data types. The invention is designed to be practiced in distributed computing environments where tasks are performed by remote processing devices that are linked through a communications network. In a distributed computing environment, program modules are located in both local and remote computer storage media including memory storage devices.

With reference to FIG. 1, an exemplary system for implementing the invention includes a general-purpose computing device in the form of a computer 110. Components of computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 110 typically includes a variety of computer readable media. Computer readable media can be any available media that can be accessed by computer 110 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 110. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

The computer 110 may also include other removable/non-removable volatile/nonvolatile computer storage media. By way of example only, FIG. 1 illustrates a hard disk drive 141 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 1, provide storage of computer readable instructions, data structures, program modules and other data for the computer 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies.

A user may enter commands and information into the computer 110 through input devices such as a keyboard 162, a microphone 163 (which can be either built into the computer or a separate device), a telephony board connected to a telephone line, and a pointing device 161, such as a mouse, trackball or touch pad. Other input devices (not shown) may include a joystick, game pad, satellite dish, scanner, or the like. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through an output peripheral interface 195.

The computer 110 is operated in a networked environment using logical connections to one or more remote computers, such as a remote computer 180. The remote computer 180 may be a personal computer, a hand-held device, a server, a router, a network PC, a peer device or other common network node, and typically includes many or all of the elements described above relative to the computer 110. The logical connections depicted in FIG. 1 include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the computer 110, or portions thereof, may be stored in the remote memory storage device. By way of example, and not limitation, FIG. 1 illustrates remote application programs 185 as residing on remote computer 180. It will be appreciated that the network connections shown are exemplary and other means of establishing a communications link between the computers may be used.

Figure 2:
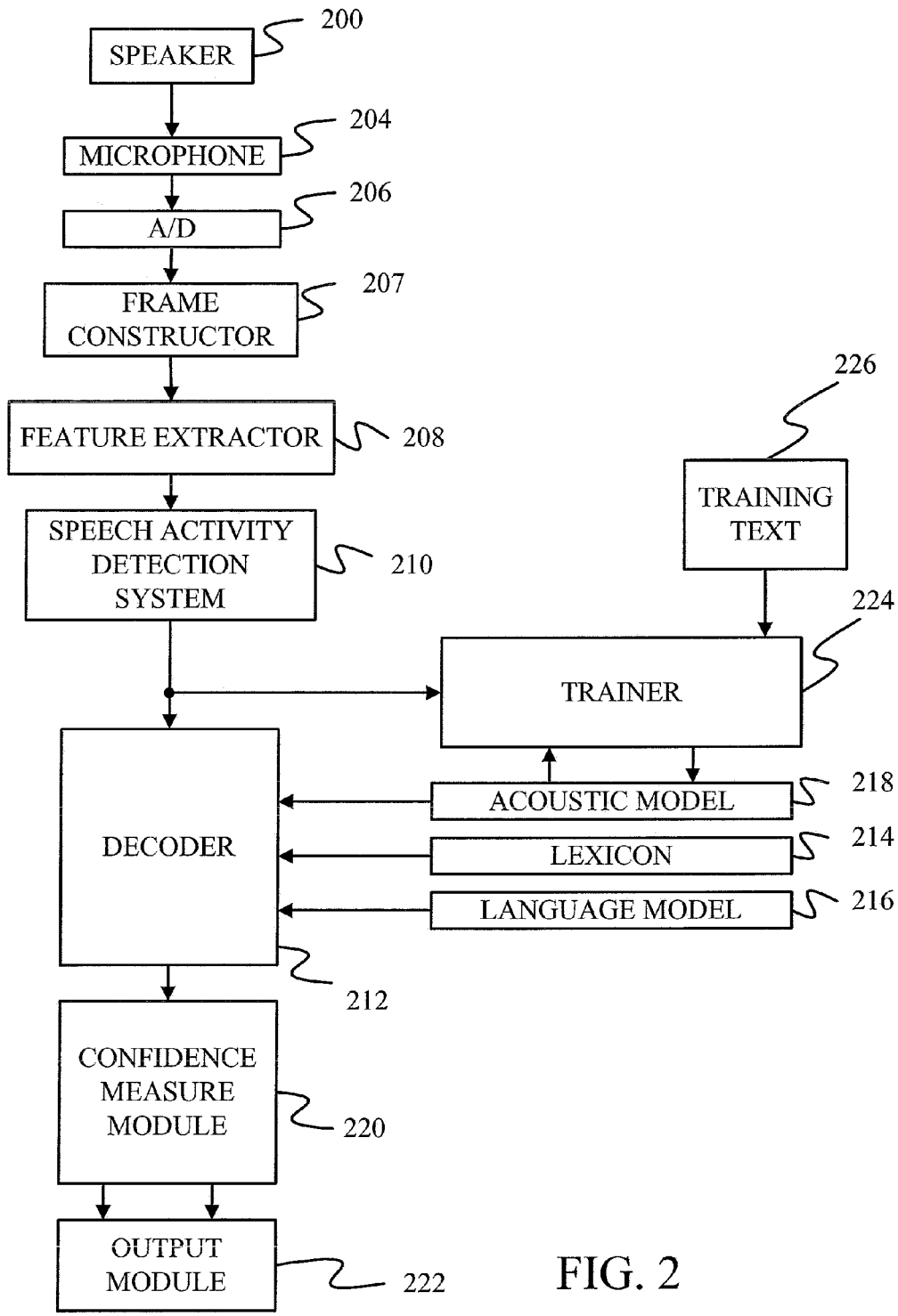
FIG. 2 is a block diagram of one illustrative speech recognition system in which the present invention can be used.

FIG. 2 provides a block diagram of an environment in which the models trained using the present techniques may be utilized. In particular, FIG. 2 shows a speech recognition system in which a speech activity detection system 210 and an acoustic model 218 can be used to identify the linguistic content of an input signal.

In FIG. 2, a speaker 200 (either a trainer or a user) speaks into a microphone 204. The audio signals detected by microphone 204 are converted into electrical signals that are provided to analog-to-digital (A-to-D) converter 206.

A-to-D converter 206 converts the analog signal from microphone 204 into a series of digital values. In several embodiments, A-to-D converter 206 samples the analog signal at 16 kHz and 16 bits per sample, thereby creating 32 kilobytes of speech data per second. These digital values are provided to a frame constructor 207, which, in one embodiment, groups the values into 25 millisecond frames that start 10 milliseconds apart.

The frames of data created by frame constructor 207 are provided to feature extractor 208, which extracts a feature from each frame. Examples of feature extraction modules include modules for performing Linear Predictive Coding (LPC), LPC derived Cepstrum, Perceptive Linear Prediction (PLP), Auditory model feature extraction, and Mel-Frequency Cepstrum Coefficients (MFCC) feature extraction. Note that the invention is not limited to these feature extraction modules and that other modules may be used within the context of the present invention.

The feature extraction module produces a stream of feature vectors that are each associated with a frame of the speech signal. This stream of feature vectors is provided to speech activity detection system 210, which detects whether a feature vector represents speech or non-speech (such as silence or noise). If system 210 decides that the feature vector represents speech, the feature vector is provided to decoder 212.

Noise reduction can also be used so the output from speech activity detection system 210 is a series of "clean" feature vectors. If the input signal is a training signal, this series of "clean" feature vectors is provided to a trainer 224, which uses the "clean" feature vectors and a training text 226 to train an acoustic model 218 and/or speech activity detection system 210 (or other models) as described in greater detail below.

If the input signal is a test signal, the "clean" feature vectors are provided to a decoder 212, which identifies a most likely sequence of words based on the stream of feature vectors, a lexicon 214, a language model 216, and the acoustic model 218. The particular method used for decoding is not important to the present invention and any of several known methods for decoding may be used.

The most probable sequence of hypothesis words is provided to a confidence measure module 220. Confidence measure module 220 identifies which words are most likely to have been improperly identified by the speech recognizer, based in part on a secondary acoustic model (not shown). Confidence measure module 220 then provides the sequence of hypothesis words to an output module 222 along with identifiers indicating which words may have been improperly identified. Those skilled in the art will recognize that confidence measure module 220 is not necessary for the practice of the present invention.

Although FIG. 2 depicts a speech recognition system, the present invention may be used in any pattern recognition system and is not necessarily limited to speech.

Figure 3A:
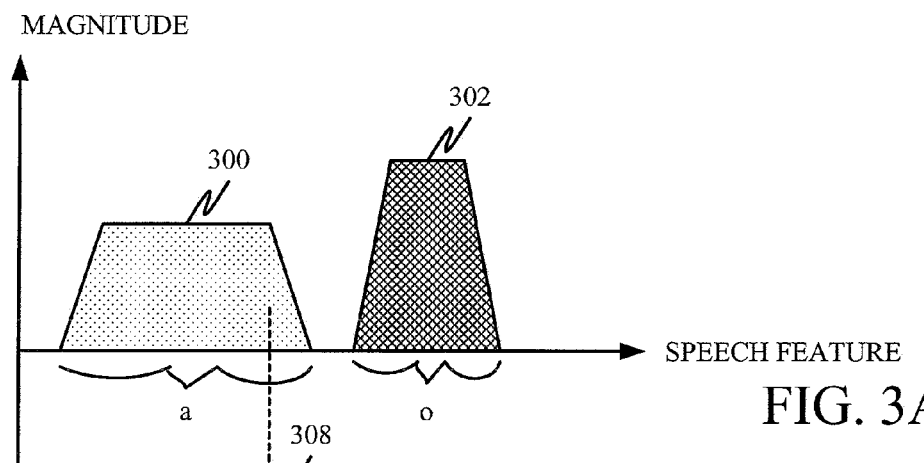
FIG. 3A illustrates a plot of training data.

As described above, an acoustic model attempts to model, with Gaussian distributions, speech feature vectors which represent an acoustic speech signal. FIG. 3A is a plot of speech feature vectors for two portions of an acoustic signal (which is not shown). The first set of data designated by number 300 represents, for example, a phone "a". The second set of data designated 302 illustratively represents a phone "o". The data 300 and 302 are outlined simply to illustrate the exemplary overall shape of the feature vector clusters representing the two phones.

Figure 3B:
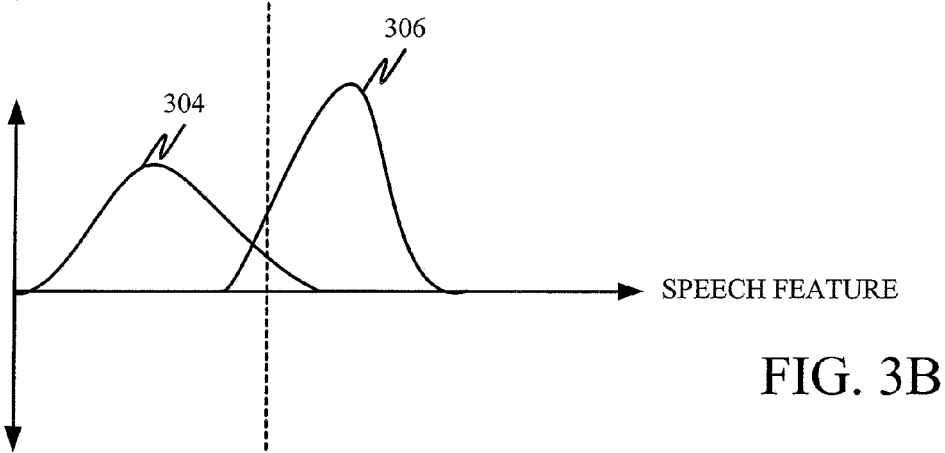
FIG. 3B illustrates a pair of Gaussian models trained using maximum likelihood training.
Figure 3C:
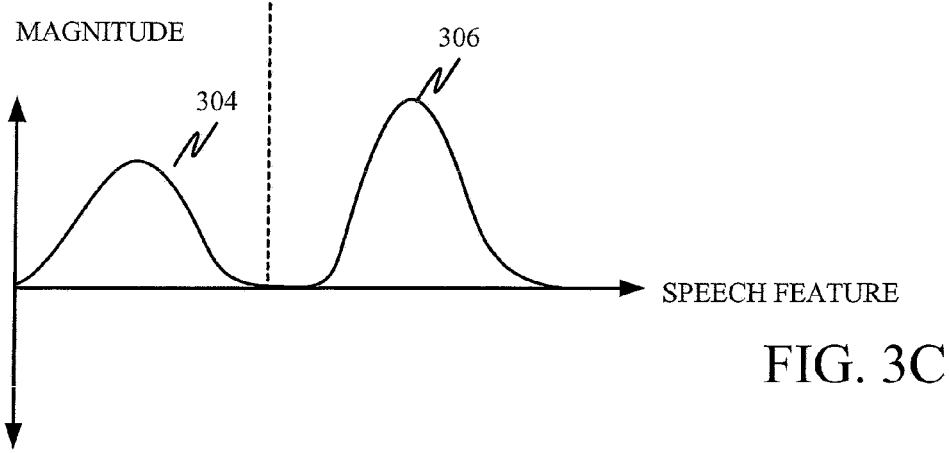
FIG. 3C illustrates the models shown in FIG. 3B after they have been repositioned to better reflect the training data.

In some current systems, the data shown in FIG. 3A is fed into a maximum likelihood training system which trains Gaussian distributions to model the data shown in FIG. 3A. FIG. 3B is a plot of two Gaussian distributions 304 and 306 illustratively trained using a maximum likelihood training system. Gaussian distribution 304 represents dataset 300, while Gaussian distribution 306 represents dataset 302. FIGS. 3A and 3B show that, even though the datasets 300 and 302 are generally rectangular in shape, they are modeled by the well known bell curve which represents a Gaussian distribution. Thus, there is a mismatch between the form of the unknown true data distribution (here, a rectangular distribution) and the form of the model distribution (here, a Gaussian distribution). This can result in some problems, especially in the area where models 304 and 306 overlap.

For instance, FIG. 3B shows that the data in dataset 300 that lies to the right of the dashed line 308 will actually be recognized in a speech recognition system as belonging to Gaussian distribution 306, instead of belonging to Gaussian distribution 304, even though the data is from dataset 300, which is modeled by Gaussian distribution 304. This is because maximum likelihood training techniques focus on increasing the likelihood that any speech feature vector belonging to a given phone such as "a" is represented by a Gaussian such as Gaussian 304.

Since the data plotted in FIG. 3A is training data, it is known that all of the data to the right of dashed line 308, but still in cluster 300, belongs to the phone "a" and should be modeled by Gaussian distribution 304. It is also known that this data will be incorrectly identified as being modeled by Gaussian distribution 306. Therefore, during recognition, it is known that the speech recognition system will transcribe that data as the phone "o" instead of as the phone "a".

The present system thus operates to locate the decision boundary between the two models 304 and 306 and adjust the position of the models such that the decision boundary is better able to ensure that all feature vectors belonging to phone "a" are on one side of the boundary (the side that includes Gaussian distribution 304), and that all feature vectors belonging to "o" are on the other side of the boundary (the side of the boundary containing Gaussian distribution 306). In other words, the models are trained, and tuned, in order to minimize recognition error, instead of to maximize the likelihood of outputting a given result. The basic idea is that, when building a Gaussian mixture model for a senone, the present system trains the model to be not only close to the training data representing that senone, but also to be far enough away from data representing other confusable senones such that one of the other confusable senones does not over-take the correct senone in the recognition process.

Figure 4:
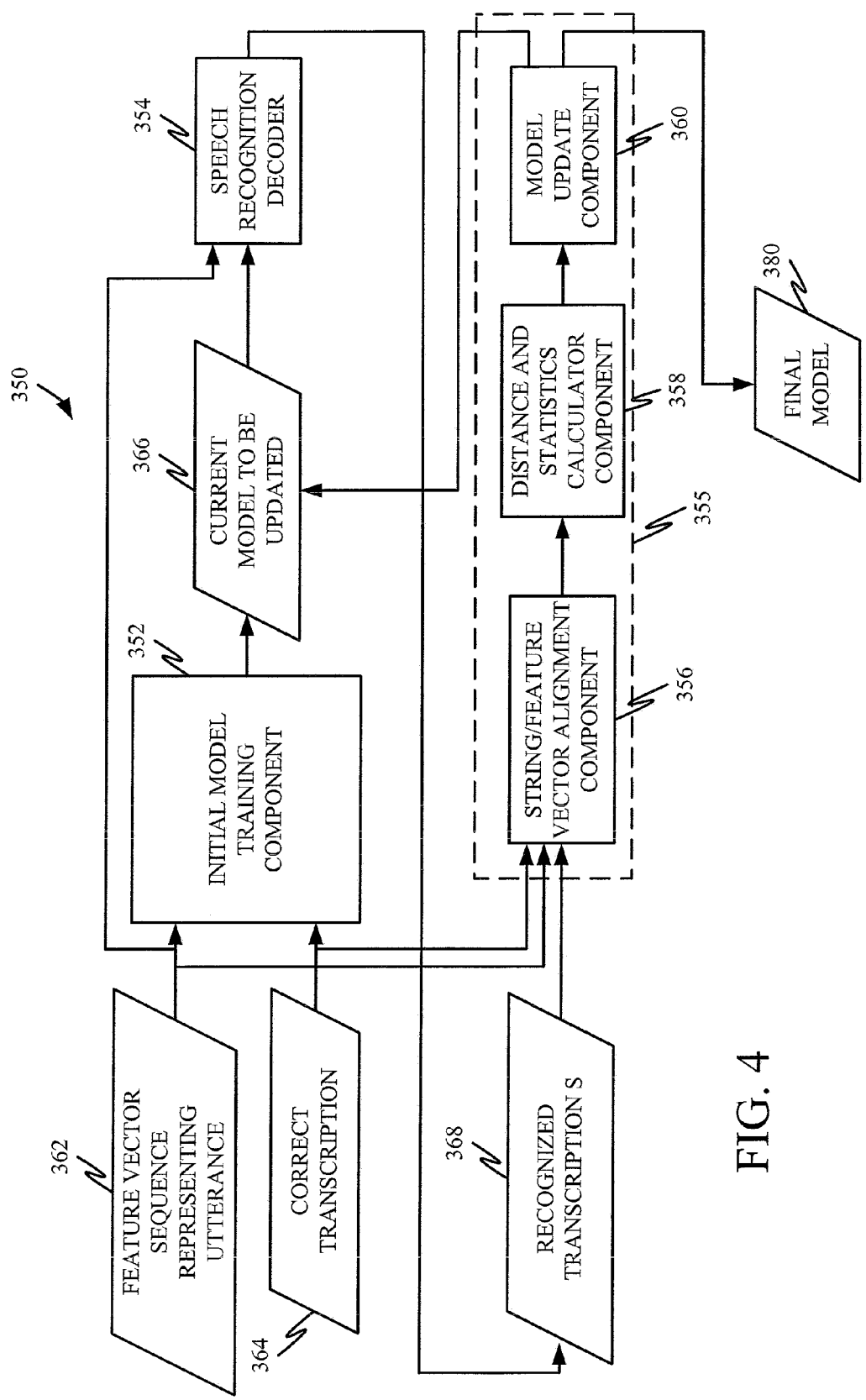
FIG. 4 is a block diagram of one illustrative training system in accordance with one embodiment.

FIG. 4 is a block diagram illustrating one training system 350 in accordance with one embodiment. System 350 includes an initial model training component 352 (which may be included in trainer 224 in FIG. 2), a speech recognition decoder 354 (which may be similar to decoder 212 in FIG. 2), and a competitive training system 355 (which may also be included in trainer 224 in FIG. 2) that includes a string/feature vector alignment component 356, a distance and statistic calculator component 358 and a model update component 360.

As mentioned above, an acoustic model might include tens of thousands of multi-dimensional Gaussian probabilities for thousands of different context-dependent phones. For each sub-phone (e.g., senone), a Gaussian mixture distribution is estimated.

In general, the training data includes a set of utterances. For each utterance, the continuous acoustic signal is segmented into short frames, such as 25 millisecond frames starting every ten milliseconds. Then, a feature vector is generated for each frame and the whole utterance is converted to a sequence of feature vectors. Meanwhile, the transcript of this utterance is expanded to a senone sequence based on a lexicon. The transcript can then be aligned with the feature vector sequence to know which vector belongs to which senone. In practice, the probability that a vector belongs to a Gaussian of a senone can be computed.

Figure 5:
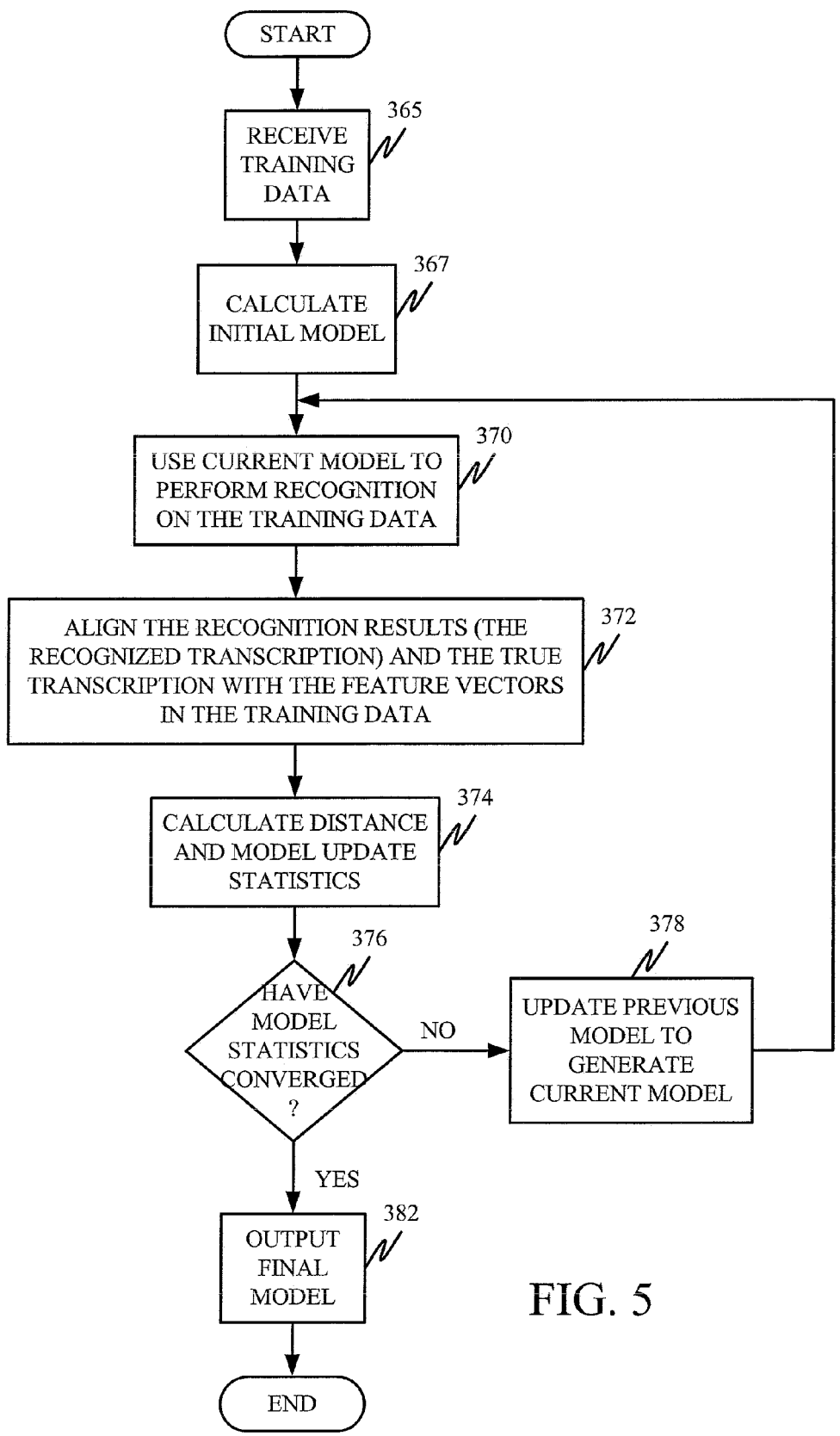
FIG. 5 is a flow diagram illustrating the overall operation of the system shown in FIG. 4.

Initial model training component 352 first receives training data. This is indicated by block 365 in FIG. 5. Initial model training component 352 may be any type of component that trains an initial model based on training data. The training data can be data such as a feature vector sequence representing an utterance 362, and a correct transcription 364 of those feature vectors. In one embodiment, initial model training component 352 is a maximum likelihood training component.

Maximum likelihood training is a widely used technique. In maximum likelihood training, for each senone, a Gaussian mixture distribution is built as close as possible to the data distribution for that senone. The mean and variance for the vectors can be computed as model parameters for a model 366. Model 366 is designated as a current model to be updated, as will be described below. In the embodiment in which model 366 is the model produced by initial model training component 352, it may also be referred to as the initial model. Calculating the initial model 366 is indicated by block 367 in the flow diagram shown in FIG. 5.

In any case, the feature vector sequence 362 representing the utterance (or the continuous acoustic signal representing the utterance) is input to speech recognition decoder 354 which uses current model 366 to perform speech recognition on the input. Speech recognition decoder 354 then outputs a recognized transcription, which is recognized based upon the input feature vector sequence 362. The recognized transcription is indicated by block 368 in FIG. 4, and using the current model to perform recognition on the training data is indicated by block 370 in FIG. 5.

Recognized transcription 368 is provided, along with the training data 362 (such as the feature vector sequence) and the true transcription 364, to competitive training system 355.

It can be seen that, in speech recognition decoder 354, the true transcription 364 will compete with other possible transcriptions to be output as the recognized transcription 368. If other possible transcriptions (incorrect transcripts) win, decoder 354 outputs an incorrect result as the recognized transcription 368.

Therefore, competitive training system 355, and in particular string/feature vector alignment component 356, aligns the correct transcription 364 against the data, as well as the recognized transcription 368. The distance of the correct transcription 364 and the recognized transcription 368 from the data is computed, along with other statistics (such as probabilities) by distance and statistics calculator component 358. As will be described in greater detail below, component 358 calculates statistics which can be used to minimize the distance between the correct transcription 364 and the data as well as to space the correct model and the closest incorrect model from one another. Aligning the recognized transcription and the true transcription with the feature vectors in the training data is indicated by block 372 in the flow diagram of FIG. 5. Calculating the distance and the model update statistics is indicated by block 374 in FIG. 5.

If the model parameters have not yet converged, then model update component 360 updates the acoustic model based on the parameters calculated by component 358. This is indicated by blocks 376 and 378 in FIG. 5. The updated model then replaces current model 366. The replaced current model 366 is then used by speech recognition decoder 354 to generate another recognized transcription 368 (speech recognition result) based on the input training data, and the process repeats itself. The process continues iterating in this way, updating the model 366, using the updated model 366 in recognition and calculating new model parameters until the model parameters reach a desired convergence threshold.

If, at block 376, the model has converged, then model update component 360 outputs the final model 380. This is indicated by block 382 in the flow diagram of FIG. 5.

In order to better illustrate how competitive training system 355 operates, the mathematical framework for training system 355 is now described.

First, denote $\Lambda$ as the acoustic model parameter set. Then, all training utterances are concatenated together to form a super utterance. For this super utterance, denote X as its feature vector sequence, Wc as its true transcript, and We as its recognized string (or recognized transcription). A distance between the true transcription and the recognized string, d(X), is computed as follows:

$$d(X) = \log f(X, W_e | \Lambda) - \log f(X, W_c | \Lambda) \qquad \text{Eq. 1}$$

Then, the larger the d(X), the more incorrect the recognized string is, and the more errors occur in the recognition result.

The goal of competitive training is to train the model $\Lambda$ to minimize (or at least to reduce) the distance d(X). This is equivalent to maximizing:

$$P(\Lambda) = \frac{e^{-d(X)}}{1 + e^{-d(X)}} \qquad \text{Eq. 2}$$

After expansion, $$P(\Lambda) = \frac{f(X, W_c | \Lambda)}{f(X, W_e | \Lambda) + f(X, W_c | \Lambda)} \qquad \text{Eq. 3}$$

Although maximizing $P(\Lambda)$ is not easy, we can increase $P(\Lambda)$ iteratively. That method is now described.

Denote $G(\Lambda) = f(X, W_c; \Lambda)$, $H(\Lambda) = f(X, W_e; \Lambda) + N \cdot f(X, W_c; \Lambda)$ and $F(\Lambda; \Lambda') = G(\Lambda) - P(\Lambda') H(\Lambda) + D$. Increasing $F(\Lambda; \Lambda')$ can guarantee that $P(\Lambda) \geq P(\Lambda')$, where D is a constant.
So:

$$\begin{aligned} F(\Lambda; \Lambda') &= G(\Lambda) - P(\Lambda')H(\Lambda) + D \qquad \text{Eq. 4}\\ &= f(X, W_c | \Lambda) - \frac{f(X, W_c | \Lambda')}{f(X, W_e | \Lambda') + f(X, W_c | \Lambda')} \cdot \\ &\quad (f(X, W_e | \Lambda) + f(X, W_c | \Lambda)) + D \\ &= \sum_s [f(s, W_c) \cdot f(X | s, W_c, \Lambda)] - \\ &\quad \sum_s \left[ \frac{f(X, W_c | \Lambda')}{f(X, W_e | \Lambda') + f(X, W_c | \Lambda')} \cdot \right. \\ &\quad \left. \begin{pmatrix} f(s, W_e) \cdot f(X | s, W_e, \Lambda) + \\ f(s, W_c) \cdot f(X | s, W_c, \Lambda) \end{pmatrix} \right] + D \end{aligned}$$

Where s is the Gaussian component sequence.
Further derivation will give:

$$\begin{aligned} F(\Lambda; \Lambda') &= \sum_s \left[ f(s, W_c) - \frac{f(X, W_c; \Lambda')}{f(X, W_e; \Lambda') + f(X, W_c; \Lambda')} \cdot \right. \qquad \text{Eq. 5}\\ &\quad \left. (f(s, W_e) + f(s, W_c)) \right] \cdot \\ &\quad f(X | s; \Lambda) + D \\ &= \sum_s \int_\chi [1_\chi(X) \cdot f(s, W_c) - \\ &\quad \frac{f(X, W_c; \Lambda')}{f(X, W_e; \Lambda') + (X, W_c; \Lambda')} \cdot \\ &\quad (f(s, W_e) + f(s, W_c)) + d(s)] \cdot \\ &\quad f(\chi | s; \Lambda) d\chi \end{aligned}$$

where $$D = \sum_s d(s),$$

and for each s, d(s) is chosen to guarantee that the term in the large bracket is non-negative, and the integration domain $\chi$ is a space with P×T dimensions, given P is the feature dimension and T is the number of data frames.

Now, denote:

$$h(\chi, s, \Lambda) = [1_\chi(X) \cdot f(s, W_c) - \frac{1_\chi(X) \cdot f(X, W_c; \Lambda')}{f(X, W_e; \Lambda') + N \cdot f(X, W_c; \Lambda')} \cdot (f(s, W_e) + + f(s, W_c)) + d(s)] \cdot f(\chi | s, \Lambda)$$

$$= [1_\chi(X)(N \cdot \frac{f(s, W_c)f(\chi, W_i; \Lambda') - f(\chi, W_c; \Lambda')f(s, W_e)}{f(\chi, W_i; \Lambda') + f(\chi, W_c; \Lambda')}) + d(s)] \cdot f(\chi | s; \Lambda)$$ 
Eq. 6 and $$F(\Lambda; \Lambda') = \sum_s \int_\chi h(\chi, s, \Lambda)d\chi$$
Eq. 7

According to Jensen's inequality, increasing $F(\Lambda;\Lambda')$ can be guaranteed by maximizing:

$$\sum_s \int_\chi h(\chi, s, \Lambda')\log h(\chi, s, \Lambda)d\chi.$$
Eq. 8

Since the bracketed term of $h(\chi,s,\Lambda)$ is independent with $\Lambda$, maximizing $$\sum_s \int_\chi h(\chi, s, \Lambda')\log h(\chi, s, \Lambda)d\chi$$

is equivalent to maximizing $V(\Lambda)$, where:

$$V(\Lambda) = \sum_s \int_\chi [1_\chi(X) \cdot f(s, W_c) \frac{1_\chi(X) \cdot f(X, W_c; \Lambda')}{f(x, W_e; \Lambda') + f(X, W_c; \Lambda')} \cdot (f(s, W_e) + f(s, W_c)) + d(s)] \cdot f(\chi | s; \Lambda')\log f(\chi | s; \Lambda)d\chi$$
Eq. 9

Dividing through the above equation 9 by $f(X, W_c;\Lambda')$, it becomes:

$$U(\Lambda) = \sum_s \left[ \frac{f(X, W_e; \Lambda')[f(s | X, W_c; \Lambda') - f(s | X, W_e; \Lambda')]}{f(X, W_e; \Lambda') + f(X, W_c; \Lambda')} \right] \log f(X | s; \Lambda) + \sum_s d'(s) \int_\chi f(\chi | s; \Lambda')\log f(\chi | s; \Lambda)d\chi$$
Eq. 10 where $d'(s)=d(s)/f(X, W_c;\Lambda')$, $$\gamma(t, m, W_c) = \sum_{s, s_t=m} p(s | X, W_c, \Lambda') = p(s_t = m | X, W_c, \Lambda'),$$

$$d'(t, m) = \sum_{s, s_t=m} d'(s),$$

$\chi t$ is a P-dimensional space. Maximizing $U(\Lambda)$ will increase $P(\Lambda)$.

Denote $$\Delta\gamma(t, m) = \frac{f(X, W_e; \Lambda')[\gamma(t, m, W_c) - \gamma(t, m, W_e)]}{f(X, W_e; \Lambda') + f(X, W_c; \Lambda')},$$

and $U(\Lambda)$ can be further simplified:

$$U(\Lambda) = \sum_{t,m} \Delta\gamma(t, m)\log f(x_t | s_t = m; \Lambda) + \sum_{t,m} d'(t, m) \int_{\chi_t} f(\chi_t | s_t = m; \Lambda')\log f(\chi_t | s_t = m; \Lambda)d\chi_t$$
Eq. 11

Therefore, maximizing $U(\Lambda)$ in equation 11 acts to reduce the distance set out in equation 1.

The mean and variance estimation formula for updating the model are (for the m-th Gaussian):

$$\hat{\mu}_m = \frac{\sum_i \sum_t \Delta\gamma(i, t, m)x_t + D_m\mu_m}{\sum_i \sum_t \Delta\gamma(i, t, m) + D_m},$$
Eq. 12

$$\hat{\Sigma}_m = \frac{\sum_i \sum_t [\Delta\gamma(i, t, m)(x_t - \hat{\mu}_m)(x_t - \hat{\mu}_m)^T] + D_m\Sigma_m + D_m(\hat{\mu}_m - \mu_m)(\hat{\mu}_m - \mu_m)^T}{[\sum_i \sum_t \Delta\gamma(i, t, m) + D_m]}$$
Eq. 13

The value for D is used to determine the update speed (i.e., the speed of convergence). Although a very large value of D is required to satisfy the "non-negative term" requirement of Jensen's inequality, it can be too large and lead to a very slow convergence speed. Therefore, in one embodiment, D is specified to each Gaussian component. For example, for the r-th Gaussian, $$D_r = \tau + E \cdot \gamma(t, r; W_e)$$
Eq. 14 where $\tau$ is a value empirically set to ensure that the value of D is positive; and E is a constant which may be empirically set to a desired value. One value for E is illustratively a value approximately between 2 and 5.

Figure 6:
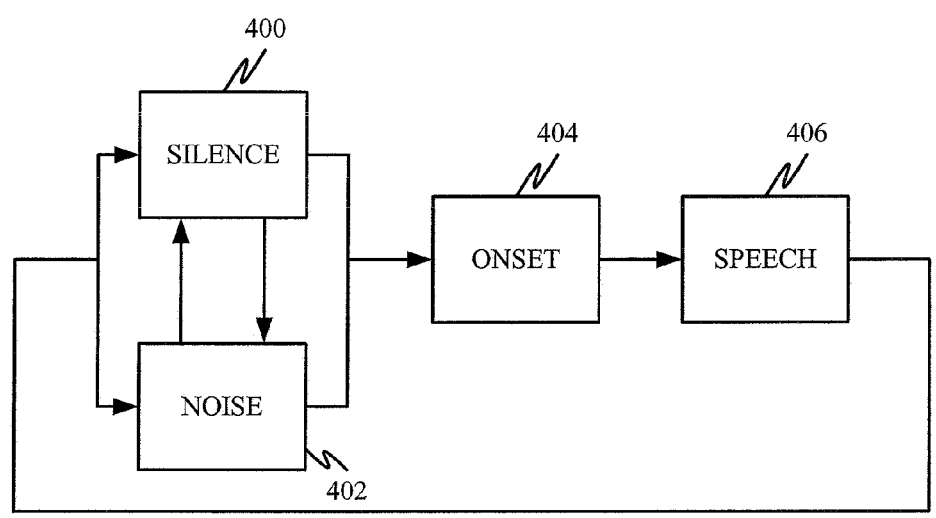
FIG. 6 is a block diagram illustrating allowed transitions from one event to another in a speech activity detector in accordance with one illustrative embodiment.

While the above discussion has proceeded with respect to using competitive training to generate acoustic model parameters, it can also be used in a speech detection system. FIG. 6 is a block diagram illustrating allowed transitions from one event to another in speech activity detection.

In accordance with one detection process, the input waveforms are categorized into four, relatively small classes. They include, speech, which means that the input waveform corresponds to a pure speech segment, and may also include a short pause in the speech segment; onset which means that the input waveform corresponds to a transition from non-speech to speech; silence, which means that the input waveform corresponds to silence or a long pause in speech; and noise, which means that the input waveform corresponds to other noise sounds which may even be speech-like, such as the echo of a prompt, or noise which is unlike speech, such as typing on a keyboard, etc.

FIG. 6 illustrates that there can be a transition from silence state 400 to noise state 402, or vice versa. In addition, FIG. 6 shows that there can be a transition from either silence state 400 or noise state 402 to onset state 404. There can be a transition from onset state 404 to speech state 406, and from speech state 406 to either silence state 400 or noise state 402.

Speech activity detection systems can thus very broadly be described as a two-class verification problem, where speech and non-speech are modeled by Gaussian mixture models. For each chunk of input frames, $X=[\vec{x}_1, \ldots, \vec{x}_t]$, a pair of competitive functions, one for speech and one for non-speech, are constructed (i.e., d(Sp, X) and d(NonSp, X)). Then, the decision of the speech detector can be made based on the following threshold selections:

Choose "NonSpeech" if $d(Sp,X)<T0$ and $d(\text{Non-Speech},X)<T0$;  Eq. 15

Else Choose "Speech" if $d(Sp,X)-d(\text{NonSpeech},X)>T1$;  Eq. 16

Else Choose "NonSpeech".  Eq. 17

Where T0 is a minimum threshold, and T1 is a second threshold. The rule set out in equation 1 is designed to filter out outlying signals that are not modeled by either the speech class or the non-speech class. The rules set out in equations 2 and 3 represent a simple decision on whether the signal represents speech or non-speech, based on whether the difference between those two competitive functions exceeds a threshold value T1.

The competitive function can be constructed with the posterior probability density functions with respect to each class, as follows:

$d(Sp,X)=P(Sp|X)$  Eq. 18

Or a smoothed likelihood over the current observation window, such as:

$d(Sp,X)=\text{Smooth}(f(x(1);Sp), \ldots, f(x(T);Sp)$  Eq. 19

As discussed above, false rejection is a decision error when the samples represented by the input waveform represent speech, but the speech detector incorrectly decides that it represents non-speech. False acceptance is a decision error in which the input samples represent non-speech, but the speech detector incorrectly decides that they represent speech. When the model parameters remain the same, by varying only threshold T1 in Eq. 16 above, both the rates for false rejection and false acceptance are affected, but in different directions.

However, if the threshold T1 is held constant, then varying the model parameters in an appropriate way affects the competitive functions so that both false rejection and false acceptance can be reduced. One appropriate way to tune the model parameters is to use competitive training which aims to enlarge the distance output by the competitive function for a correct class relative to that for an incorrect, competing class.

More specifically, each class of events in a speech activity detector can be characterized by a set of diagonal covariance Gaussian mixtures, and given the Gaussian mean vector $\vec{\mu}$ and variance vector $\vec{\sigma}$, the likelihood of an input feature vector $\vec{x}$ against that Gaussian component is defined as:

$$f(\vec{x}; \vec{\mu}, \vec{\sigma}) = \frac{C}{\prod_{i=1}^{D} \sigma_i} \exp\left[-\sum_{i=1}^{D} \frac{(x_i - \mu_i)^2}{2\sigma_i^2}\right]$$  Eq. 20

Where D is a dimension of the feature vector and C is a constant value. The competitive function of a window of frames $X=[\vec{x}_1, \ldots \vec{x}_t]$ is defined as:

$$d(Sp, X) = \frac{1}{T}\sum_{t=1}^{T} \log f(\vec{x}_t; Sp) \text{ and}$$  Eq. 21

$$d(NonSp, X) = \frac{1}{T}\sum_{t=1}^{T} \log f(\vec{x}_t; NonSp)$$

Where $f(\vec{x}; Sp)$ is the maximum likelihood of feature vector $\vec{x}$ against all Gaussian components in a class of speech, and $f(\vec{x}; NonSp)$ is the maximum likelihood for non-speech. The center frame $[X]=\vec{x}_{[T/2]}$, of the window is treated as a valid speech frame if $d(Sp,X)>T0$ and $d(NonSp,X)>T0$ and $d(Sp,X)-d(NonSp,X)>T1$.

Given this definition, the goal of achieving the best detection accuracy can be expressed by minimizing the following error count:

$$E(T_0, T_1) = \sum_X 1\{[X] \in NonSpeech \wedge d(Sp, X) > T_0 \wedge d(NonSp, X) >$$

$$T_0 \wedge d(Sp, X) - d(NonSp, X) > T_1\} + \sum_X 1\{[X] \in$$

$$Speech \wedge d(Sp, X) < T_0 \vee d(NonSp, X) <$$

$$T_0 \vee d(Sp, X) - d(NonSp, X) < T_1]\} \approx$$

$$\sum_X 1\{[X] \in NonSpeech \wedge d(Sp, X) -$$

$$d(NonSp, X) > T_1\} +$$

$$\sum_X 1\{[X] \in Speech \wedge d(Sp, X) -$$

$$d(NonSp, X) < T_1\}$$

Eq. 22

In practice, minimizing the value of E over the training set can be found by changing the value of T1 and parameters of the underlying Gaussian components alternatively. The optimum values for T1 and Gaussian components which minimize the value of E will then be used at runtime.

In order to first find the best value of T1, an initial value of T1 is set. The Gaussian parameters are then trained to find the best value and T1 is adjusted to minimize E in the Eq. 22 above. This can be done in a number of different ways.

For instance, the competitive training techniques discussed above can be used. It will be clear that in order to use competitive training to train a speech detection model that uses the allowed states shown in FIG. 6, the confusion set is quite small. There will only be four possible states: silence, noise, onset or speech. In addition, instead of having a phonetic transcription, the true transcription simply corresponds to the four states (i.e., the true transcription simply includes whether the waveform represents silence, noise, onset or speech) and the recognized transcription simply represents the state transitions actually output by the speech detector in response to receiving the input waveform (i.e., the output states actually detected by the speech detection model based on the input waveform). Again, the distance between the actual transcription and the true transcription is reduced or minimized using the equations set forth in the above discussion of competitive training in order to reposition the models to avoid false acceptance and false rejection.

Figure 7:
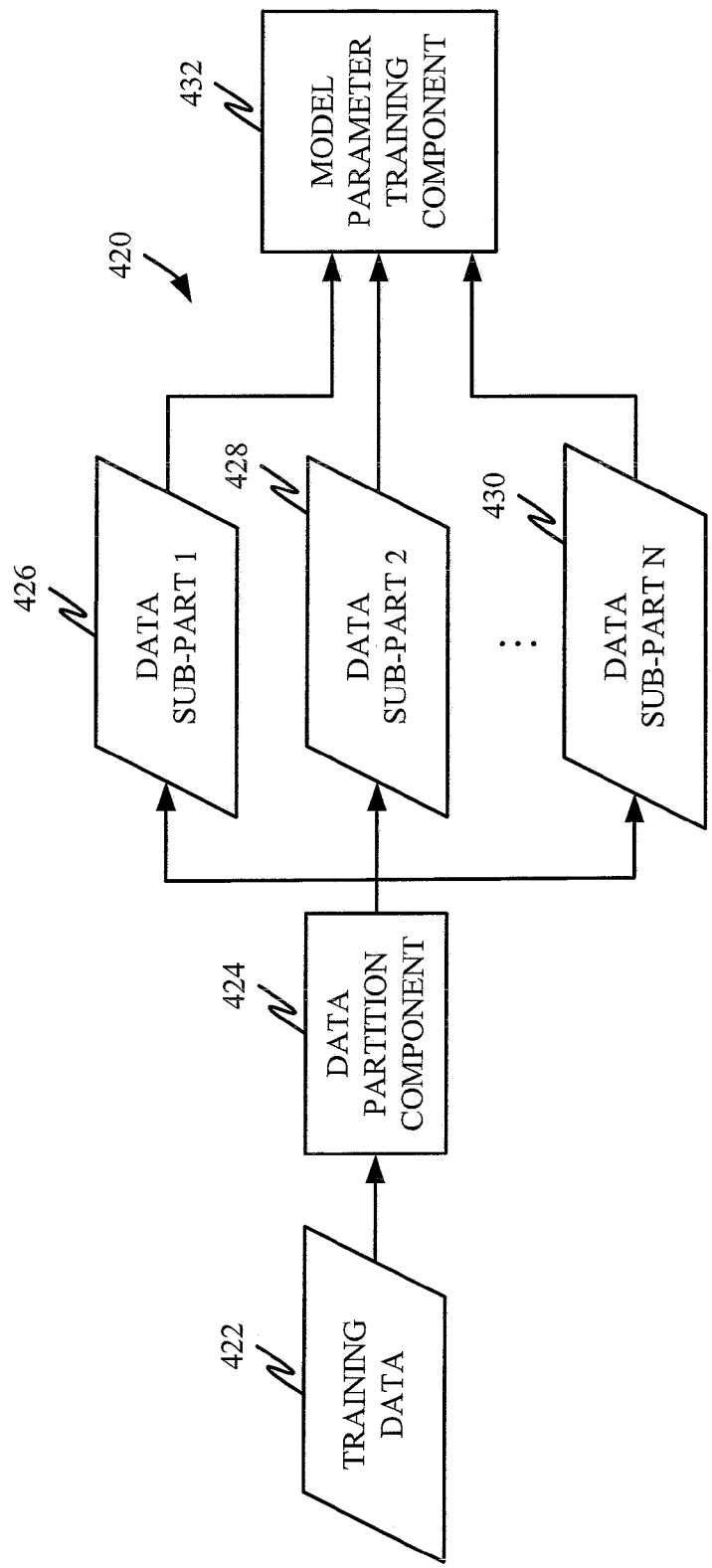
FIG. 7 is a block diagram of a training system for a speech activity detector in accordance with one embodiment.

In an alternative, a data boosting mechanism can be used. A block diagram of a data boosting system 420 is shown in FIG. 7. FIG. 7 shows that system 420 includes a set of training data 422 along with a data partition component 424 that partitions the data into subgroups 426, 428 and 430. System 420 also includes a model parameter training component 432.

In the data boosting system 420, the initial parameters of the Gaussian speech detection model are first trained using training data segments from training data 422. The segments are labeled as either speech or non-speech segments. The initial training can be performed in a variety of ways, such as using maximum likelihood estimation. Based on the initial model parameters, an initial data partition can be performed by constructing corresponding competitive functions. The competitive functions are generated by data partitioning component 424, and speech detection is run on the training data using those competitive functions. The training data that results in erroneous speech detection, such as detecting speech when the training data represents non-speech (or vice versa) is labeled to indicate that it has resulted in an inaccurate speech detection. Similarly, the data that resulted in an accurate speech detection using the initial model parameters is labeled as well.

Data partition component 424 then divides training data 422 into subparts based on whether it resulted in a correct, or incorrect, speech detection result. Of course, the data can simply be divided into two subparts based on whether the speech detection decision was correct or incorrect for that training data. Also, it can be divided up into more subparts to reflect the particular kind or type of speech detection errors which were committed with respect to the training data. For instance, the data could include a separate subsection for data that actually represented silence but was erroneously detected as speech. Another group could be for data that actually represented silence, but was erroneously detected as representing a transition from silence to speech (onset), etc.

In any case, once the data is divided, a weight is calculated with respect to each of the data subparts 426-430. Model parameter training component 432 then retrains the model parameters of the initial model based on the training data, as weighted by the weights given to each of the subparts. The weights are chosen such that training is focused more heavily in the areas where the initial model made the greatest number of errors. By focusing model training on these areas, the competitive functions can be further refined to reduce the likelihood that an error is made, and thus to reduce the error count set out in Eq. 22. This has the affect of minimizing the distance between correct speech detection decisions, given an input feature, and the actual speech detection decisions given that input feature.

One updating equation for the Gaussian mean, which incorporates the weights is shown as follows:

$$\tilde{\mu} = \mu + \frac{\sum_i \sum_{t=1}^{T_i} w_i \gamma_{it}(x_{it} - \mu)}{\sum_i \sum_{t=1}^{T_i} w_i \gamma_{it}} \qquad \text{Eq. 23}$$

where $w_i$ is the weight applied to the training data on the i-th utterance and $\gamma_{it}$ is the posterior probability of the t-th feature vector of the i-th utterance estimated during the E-step of the maximum likelihood training process.

As described in the background section, current systems for training speech models often train all of the model parameters using the same training methods and the same training settings within a given method. However, due to the complicated nature of these models, it may be highly beneficial to train some subparts of a given model using a different training methodology than some other subparts of the model. It may also be desirable, even where a similar training methodology is used for all subparts of the model, to change parameter training settings within that methodology, when training the different subparts of the model.

Figure 8:
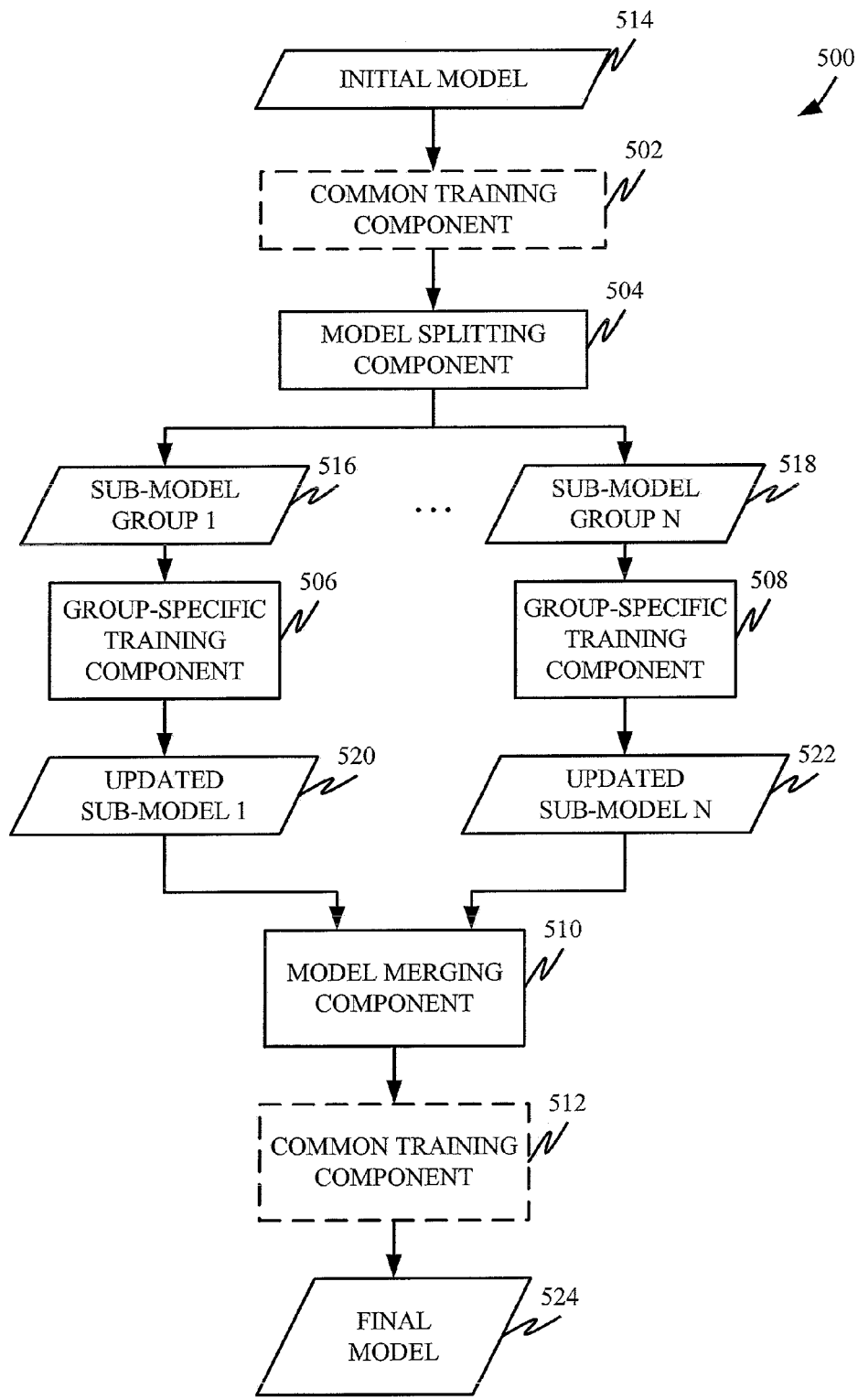
FIG. 8 is a block diagram of an asymmetric training system in accordance with one embodiment.
Figure 9:
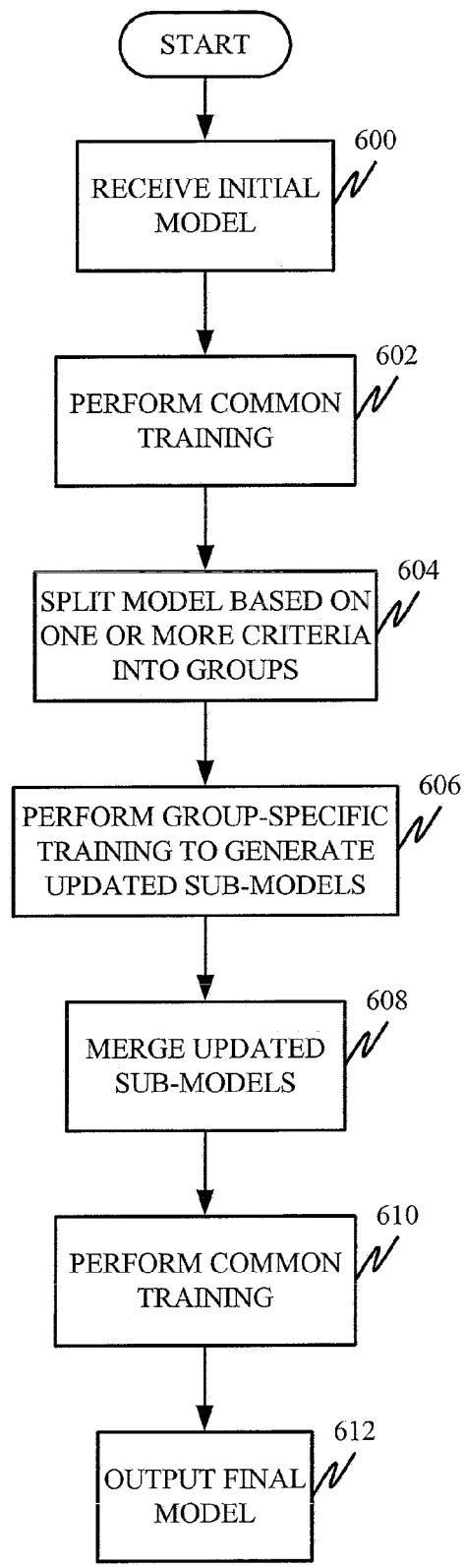
FIG. 9 is a flow diagram illustrating the overall operation of the system shown in FIG. 8.

Therefore, in accordance with one embodiment of the present system, asymmetric training is employed to train the speech models. FIG. 8 is a block diagram of an asymmetric model training system 500, and FIG. 9 is a flow diagram illustrating the overall operation of system 500 shown in FIG. 8. Asymmetric training system 500 includes an optional common training component 502, model splitting component 504, group specific training components 506 and 508, model merging component 510, and optional common training component 512.

Common training component 502 first receives an initial model 514, which may be trained using a conventional training system, such as maximum likelihood training. Other initial training techniques can be used as well. Receiving the initial model is indicated by block 600 in FIG. 9. Common training component 502 performs common training (training common to the entire model 514) on the initial model 514. This is an optional step, and can be used to implement any desired common training, given the specific implementation of the model 514. Performing common training is indicated by block 602 in FIG. 9.

Model splitting component 504 then splits the model based on predetermined criteria into sub-model groups 1-N. Sub-model group 1 is designated by numeral 516 in FIG. 8 and sub-model group N is designated by numeral 518. Splitting the model based on the predetermined criteria is indicated by block 604 in FIG. 9.

The actual criteria used to divide the model into sub-groups 516-518 can vary widely, depending for example, on the specific implementation of the model. In one example, the criteria is based on the fact that Gaussian distributions in some different categories should have minimum connection or tying between the models. For example, in some acoustic models, some specific Gaussian distribution (sub-models) are word-specific sub-models. Those word-specific sub-models will only be used in recognizing a given word, and will not be used either alone or in combination with any other sub-models, in recognizing any other word. These word-specific sub-models are sometimes referred to as whole word models. In that example, the overall model 514 can be divided into the sub-models 516-518 based on whether the sub-model is a model for a regular phone that can be used to recognize any word, or whether it represents a whole word (or word specific) sub-model. Of course, other criteria can be used as well in dividing the model into sub-models. For instance, the models can be divided based upon whether the sub-models are to be used in a dictation or a discrete speech recognizer, whether they are to be used to recognize spelling, letters, numbers or proper names, or any other desired criteria.

For the speech detection example, the sub-model groups 516-518 may be the four speech states shown in FIG. 6, for instance. Of course, they might only be two groups: speech and non-speech, or different groups as well.

Once the model is divided into sub-model groups 516-518, then group-specific training components 506 and 508 perform group-specific training on the sub-model groups 516-518. The group-specific training performed by components 506 and 508 can thus be modified to perform better or optimal training for the particular sub-model group which is being trained. The group-specific training can differ from group-to-group in any desired manner. Some differences may include changing training settings for a particular training technique being employed, changing training criteria, changing the learning rate (D in Eq. 14), changing the number of iterations performed during training, changing the utterance lengths considered during training, etc.

The group-specific training can also be completely separate training techniques based upon the sub-model group being trained. In the speech detection example, the group-specific training techniques might be used to train different competitive functions based on the different sub-model groups. The group-specific training may be used to perform competitive training, or to perform data boosting, as well.

In any case, group-specific training components 506-508 perform training on the different sub-model groups to generate updated sub-models 520 and 522. Performing group-specific training to generate the updated sub-models is indicated by block 606 in FIG. 9.

Once the updated sub-models 520-522 are generated, model merging component 510 merges sub-models 520-522 to obtain a common model. In one embodiment, each updated sub-model 520-522 is simply a set of Gaussian distributions, and model merging component 510 simply merges them together to create a super-set of all the sets in sub-models 520-522. Merging the updated sub-models is indicated by block 608 in FIG. 9.

Once the sub-models are merged into a common model, common training component 512 can perform more common training, such as smoothing or other common training, on the entire model, if desired. Of course, common training component 512 can be the same as common training component 502, or it can be a different component, implementing different training techniques. Performing common training is indicated by block 610 in FIG. 9. Once common training component 512 has completed its common training (if common training is even performed) it outputs final model 524. This is indicated by block 612 in FIG. 9.

Figure 10:
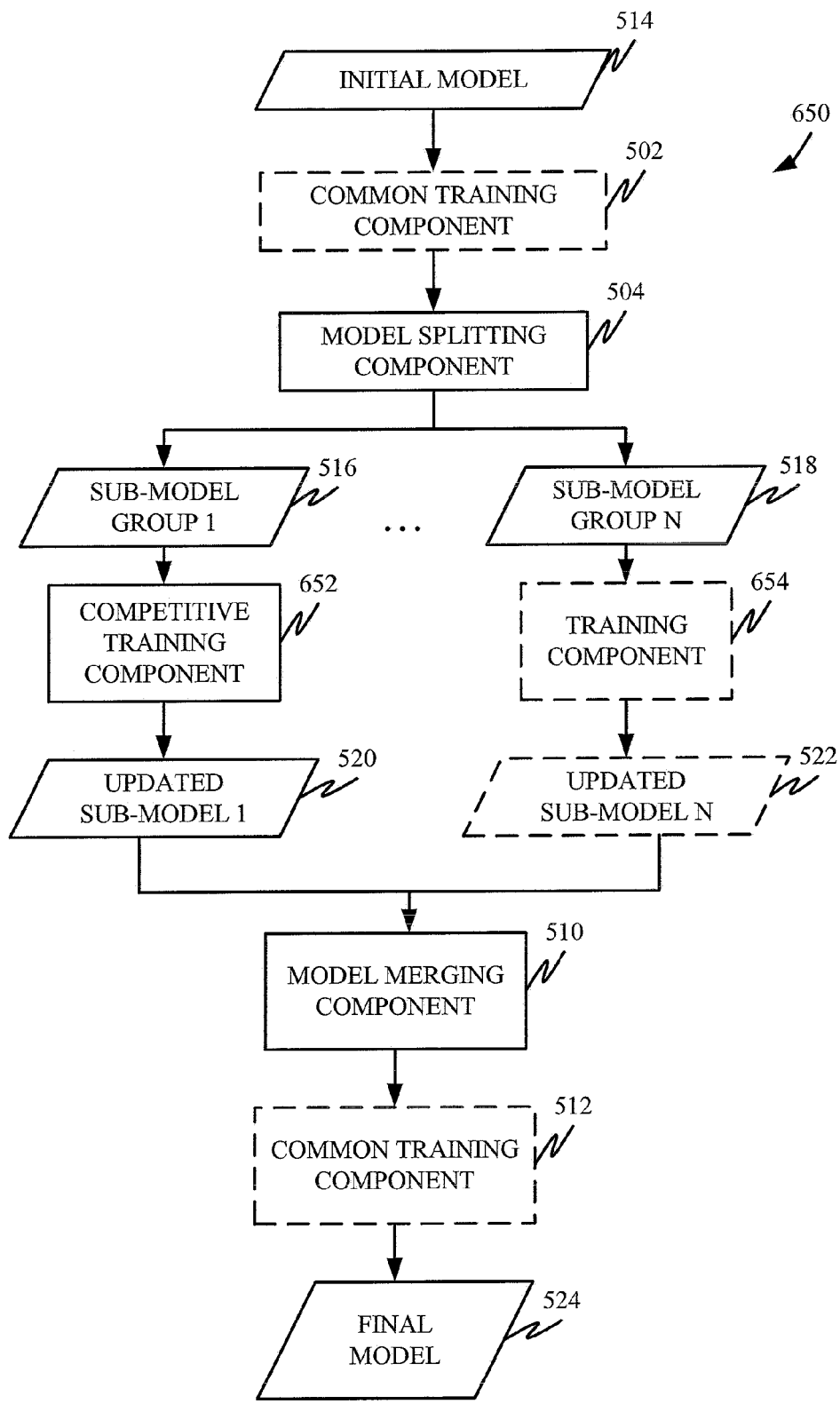
FIG. 10 is a block diagram illustrating one implementation of asymmetric training and competitive training in accordance with one embodiment.

FIG. 10 is a block diagram of a training system 650 that incorporates both asymmetric training and either competitive training or data boosting, or both into a single system. A number of items are similar to those shown in FIG. 8 and are similarly numbered. A notable difference between FIG. 10 and FIG. 8 is that group-specific training components 506 and 508 have been replaced by competitive training component 652 and training component 654. Thus, the group-specific training for sub-model 516 is competitive training as discussed above, which minimizes a distance between an actual speech model output and a true speech model output.

Training component 654, on the other hand, can be a competitive training component, with different settings than component 652, or it can be a completely different training component that implements a different training methodology, such as a training component that implements data boosting or that trains the competitive functions corresponding to the sub-model groups 518. Also, of course, training component 654 can be eliminated assuming that common training component 502 has adequately trained the sub-model group 518. In that case, sub-model group 518 is simply merged with updated sub-model 520 after it has been generated by competitive training component 652.

It will thus be clear that the present system can include competitive training which provides a number of advantages over prior training systems. In addition, the present system can included asymmetric training to train different sub-model groups differently. The present system can also include data boosting by weighting different portions of the training data to train a model or a sub-model group. The present system can also include a combination of asymmetric training and any other of the training techniques described herein, in order to provide tailored training to different parts of the speech model being trained.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A method of training a speech model, comprising:
obtaining model parameters for the speech model;
processing a known speech input using the speech model with the model parameters to generate a process result;
calculating a distance between a true result and the process result, given the model parameters and the known speech input, the true result comprising a true transcription, the true transcription corresponding to only the following waveform states: silence, noise, onset and speech, instead of a phonetic transcription; and
modifying the model parameters to reduce the distance between the true result and the process result, to obtain a modified model, wherein reducing the distance between the true result and the process result comprises maximizing a function comprising a parameter set for an acoustic model and a super utterance, the super utterance comprising a feature vector sequence, the true result and the process result.

2. The method of claim 1 and further comprising:
iterating on the steps of processing, calculating and modifying until the model parameters reach a desired convergence.

3. The method of claim 1 wherein the speech model comprises the acoustic model, and wherein processing a known speech input to generate a process result comprises:
performing speech recognition on acoustic data indicative of a known acoustic input, using the acoustic model with the model parameters, to generate a speech recognition result.

4. The method of claim 3 wherein the true result comprises a true transcription of the acoustic data and wherein calculating a distance comprises:
calculating a true transcription measure indicative of a probability of generating the true transcription, given the acoustic data and the model parameters;

calculating a speech recognition measure indicative of a probability of generating the speech recognition result, given the acoustic data and the model parameters; and calculating the distance as the difference between the transcription measure and the speech recognition measure.

5. The method of claim 1 wherein the speech model comprises a speech detection model, and wherein processing a known speech input to generate a process result comprises:

performing speech detection on acoustic data indicative of an input signal to generate a detection state output indicative of a decision made by the speech detection model as to whether the input signal represents speech or non-speech.

6. The method of claim 5 wherein the true result comprises a true detection state output indicative of whether the input signal represents speech or non-speech and wherein calculating a distance comprises:

calculating a true detection state measure indicative of a probability that the speech detection model will make a decision that the input signal represents the true detection state output, given the acoustic data and the model parameters;

calculating a speech detection state measure indicative of a probability that the speech detection model will make a decision that the input signal represents the detection state output, given the acoustic data and the model parameters; and calculating the difference as a difference between the true detection state measure and the speech detection state measure.

7. The method of claim 5 wherein performing speech detection comprises:

generating the detection state output indicative of whether the input signal represents speech, silence, noise or an onset of speech.

8. The method of claim 1 wherein obtaining model parameters for the speech model comprises:

performing maximum likelihood training on training data to obtain an initial model with initial model parameters.

9. A computer-readable storage device with computer-executable instructions stored thereon which, when executed by a computer, perform a method for training a speech model, the method comprising:

obtaining model parameters for the speech model;

processing a known speech input using the speech model with the model parameters to generate a process result;

calculating a distance between a true result and the process result, given the model parameters and the known speech input, the true result comprising a true transcription, the true transcription corresponding to only the following waveform states: silence, noise, onset and speech, instead of a phonetic transcription;

modifying the model parameters to reduce the distance between the true result and the process result, to obtain a modified model, wherein reducing the distance between the true result and the process result comprises maximizing a function comprising a parameter set for an acoustic model and a super utterance, the super utterance comprising a feature vector sequence, the true result and the process result; and iterating on the steps of processing, calculating and modifying until the model parameters reach a desired convergence.

10. The computer-readable storage device of claim 9 wherein the speech model comprises the acoustic model, and wherein processing a known speech input to generate a process result comprises:

performing speech recognition on acoustic data indicative of a known acoustic input, using the acoustic model with the model parameters, to generate a speech recognition result.

11. The computer-readable storage device of claim 10 wherein the true result comprises a true transcription of the acoustic data and wherein calculating a distance comprises:

calculating a true transcription measure indicative of a probability of generating the true transcription, given the acoustic data and the model parameters;

calculating a speech recognition measure indicative of a probability of generating the speech recognition result, given the acoustic data and the model parameters; and calculating the distance as the difference between the transcription measure and the speech recognition measure.

12. The computer-readable storage device of claim 9 wherein the speech model comprises a speech detection model, and wherein processing a known speech input to generate a process result comprises:

performing speech detection on acoustic data indicative of an input signal to generate a detection state output indicative of a decision made by the speech detection model as to whether the input signal represents speech or non-speech.

13. The computer-readable storage device of claim 12 wherein the true result comprises a true detection state output indicative of whether the input signal represents speech or non-speech and wherein calculating a distance comprises:

calculating a true detection state measure indicative of a probability that the speech detection model will make a decision that the input signal represents the true detection state output, given the acoustic data and the model parameters;

calculating a speech detection state measure indicative of a probability that the speech detection model will make a decision that the input signal represents the detection state output, given the acoustic data and the model parameters; and calculating the difference as a difference between the true detection state measure and the speech detection state measure.

14. The computer-readable storage device of claim 12 wherein performing speech detection comprises:

generating the detection state output indicative of whether the input signal represents speech, silence, noise or an onset of speech.

15. The computer-readable storage device of claim 9 wherein obtaining model parameters for the speech model comprises:

performing maximum likelihood training on training data to obtain an initial model with initial model parameters.

16. A method of training a speech model, comprising:

obtaining model parameters for the speech model, wherein the speech model comprises an acoustic model and wherein obtaining model parameters for the speech model comprises performing maximum likelihood training on training data to obtain an initial model with initial model parameters;

processing a known speech input using the speech model with the model parameters to generate a process result, wherein processing a known speech input to generate a process result comprises performing speech recognition on acoustic data indicative of a known acoustic input, using the acoustic model with the model parameters, to generate a speech recognition result;

calculating a distance between a true result and the process result, given the model parameters and the known speech input, the true result comprising a true transcription, the true transcription corresponding to only the following waveform states: silence, noise, onset and speech, instead of a phonetic transcription;

modifying the model parameters to reduce the distance between the true result and the process result, to obtain a modified model wherein reducing the distance between the true result and the process result comprises maximizing a logarithmic function comprising a parameter set for the acoustic model and a super utterance, the super utterance comprising a feature vector sequence, the true result and the process result; and iterating on the steps of processing, calculating and modifying until the model parameters reach a desired convergence.

17. The method of claim 16 wherein the true result comprises a true transcription of the acoustic data and wherein calculating a distance comprises:

calculating a true transcription measure indicative of a probability of generating the true transcription, given the acoustic data and the model parameters;

calculating a speech recognition measure indicative of a probability of generating the speech recognition result, given the acoustic data and the model parameters; and calculating the distance as the difference between the transcription measure and the speech recognition measure.

18. The method of claim 16 wherein the speech model comprises a speech detection model, and wherein processing a known speech input to generate a process result comprises:

performing speech detection on acoustic data indicative of an input signal to generate a detection state output indicative of a decision made by the speech detection model as to whether the input signal represents speech or non-speech.

19. The method of claim 18 wherein the true result comprises a true detection state output indicative of whether the input signal represents speech or non-speech and wherein calculating a distance comprises:

calculating a true detection state measure indicative of a probability that the speech detection model will make a decision that the input signal represents the true detection state output, given the acoustic data and the model parameters;

calculating a speech detection state measure indicative of a probability that the speech detection model will make a decision that the input signal represents the detection state output, given the acoustic data and the model parameters; and calculating the difference as a difference between the true detection state measure and the speech detection state measure.

20. The method of claim 18 wherein performing speech detection comprises:

generating the detection state output indicative of whether the input signal represents speech, silence, noise or an onset of speech.

* * * * *